(12) United States Patent
Lim

(10) Patent No.: US 9,341,247 B2
(45) Date of Patent: May 17, 2016

(54) POWER TRANSMISSION DEVICE

(75) Inventor: Sun Ho Lim, Bucheon-si (KR)

(73) Assignee: SEJIN-IGB CO., LTD. (KR)

( * ) Notice: Subject to any disclaimer, the term of this patent is extended or adjusted under 35 U.S.C. 154(b) by 286 days.

(21) Appl. No.: 14/112,539

(22) PCT Filed: Jan. 30, 2012

(86) PCT No.: PCT/KR2012/000660
§ 371 (c)(1),
(2), (4) Date: Oct. 17, 2013

(87) PCT Pub. No.: WO2012/144725
PCT Pub. Date: Oct. 26, 2012

(65) Prior Publication Data
US 2014/0026692 A1    Jan. 30, 2014

(30) Foreign Application Priority Data

Apr. 18, 2011   (KR) .................. 10-2011-0035467

(51) Int. Cl.
*F16H 19/04*    (2006.01)
*F16H 55/10*    (2006.01)

(52) U.S. Cl.
CPC ............... *F16H 19/04* (2013.01); *F16H 55/10* (2013.01); *Y10T 74/18088* (2015.01)

(58) Field of Classification Search
CPC ................................ F16H 55/10; F16H 19/04
See application file for complete search history.

(56) References Cited

U.S. PATENT DOCUMENTS

| 1,140,427 | A | * | 5/1915 | Wilson | F16H 55/10 |
|---|---|---|---|---|---|
| | | | | | 184/109 |
| 6,023,989 | A | | 2/2000 | Imase et al. | |
| 8,671,788 | B2 | * | 3/2014 | Lim | F16H 19/04 |
| | | | | | 74/89.11 |
| 8,893,568 | B2 | * | 11/2014 | Katayama | F16H 19/04 |
| | | | | | 184/102 |
| 8,893,569 | B2 | * | 11/2014 | Lim | F16H 19/04 |
| | | | | | 184/6.12 |
| 2012/0090415 | A1 | * | 4/2012 | Lim | F16H 19/04 |
| | | | | | 74/89.17 |
| 2013/0186213 | A1 | * | 7/2013 | Lim | F16H 19/04 |
| | | | | | 74/31 |

FOREIGN PATENT DOCUMENTS

| CN | 1366590 | A | 8/2002 |
|---|---|---|---|
| CN | 101532561 | A | 9/2009 |
| EP | 2441979 | B1 | 4/2012 |
| JP | S5786652 | A | 5/1982 |
| JP | H05187502 | A | 7/1993 |
| JP | H10184842 | A | 7/1998 |
| JP | 2003090407 | A | 3/2003 |
| JP | 2009074582 | A | 4/2009 |
| JP | 2012529605 | | 11/2012 |
| KR | 100945193 | B1 | 3/2010 |
| WO | 2010143813 | A2 | 12/2010 |
| WO | 2010143814 | A2 | 12/2010 |

* cited by examiner

*Primary Examiner* — Terence Boes

(57) ABSTRACT

Disclosed is a power transmission device. A power transmission device according to one embodiment of the present invention includes: a rack having a plurality of rack tooth profiles; a plurality of pin gears, which have a plurality of power transmission pins that rotate relative to the rack tooth profiles for power transmission, and are provided at a distance from each other along the lengthwise direction of the rack; and input gears which are disposed between the pin gears and rotatively connect the plurality of pin gears such that the pin gears rotate at the same speed as each other.

12 Claims, 4 Drawing Sheets

POWER TRANSMISSION DEVICE

TECHNICAL FIELD

The present invention relates to a transmission device for converting a torque, and more particularly, to a transmission device for converting a torque which is capable of driving a single or a plurality of pin gears with only a single driving device so that not only an increased nominal load capacity is provided compared to a conventional technology but also a desired level of a deceleration rate is obtained without a complex deceleration device while using a rack of a limited size, thereby enabling all rolling motions including a rotational motion by an input gear and a linear motion by a rack and improving efficiency in power transmission.

BACKGROUND ART

A transmission device for converting a torque is classified into a rack and pinion for converting a rotational motion to a linear motion or vice versa, and a gear train for converting a rotational speed and a torque while transmitting a rotational motion only. In most cases, a power transmission system of a transmission device for converting a torque mainly adopts a tooth profile according to an involute curve principle. However, a tooth profile according to a cycloid curve principle is used in rare cases.

Such a transmission device for converting a torque is widely used for a variety of industrial machines including semiconductor devices and flat display devices such as liquid crystal display (LCD), plasma display panel (PDP), organic light-emitting display (OLED), etc. In a transmission device for converting a torque that is applied to various industrial machines or is being prepared for application thereto, the transmission device is mostly operated as one pinion is gear-engaged with one rack, and desired power is transmitted as the pinion moves with respect to the rack or the rack moves with respect to the pinion.

However, contrary to the above typical case, when there is a limit in the size of a rack while nominal load capacity is large, a plurality of pinions or pinch gears and driving devices according thereto are required with respect to one rack. In this regard, it is difficult to match synchronization speeds of driving devices. In addition, since embodiment of a deceleration rate appropriate for high speed transmission is difficult, the application of the transmission device for converting a torque is practically delayed and thus improvement of the structure thereof is demanded.

DETAILED DESCRIPTION OF THE INVENTION

Technical Problem

The present invention provides a transmission device for converting a torque which is capable of driving a single or a plurality of pin gears with only a single driving device so that not only an increased nominal load capacity is provided compared to a conventional technology but also a desired level of a deceleration rate is obtained without a complex deceleration device while using a rack of a limited size, thereby enabling all rolling motions including a rotational motion by an input gear and a linear motion by a rack and improving efficiency in power transmission.

Description of the Drawings

According to the present invention, since a single or a plurality of pin gears can be driven with only a single driving device, not only an increased nominal load capacity is provided compared to a conventional technology but also a desired level of a deceleration rate is obtained without a complex deceleration device while using a rack of a limited size and thus all rolling motions including a rotational motion by an input gear and a linear motion by a rack may be possible and efficiency in power transmission may be improved.

DESCRIPTION OF THE DRAWINGS

Figure 1:
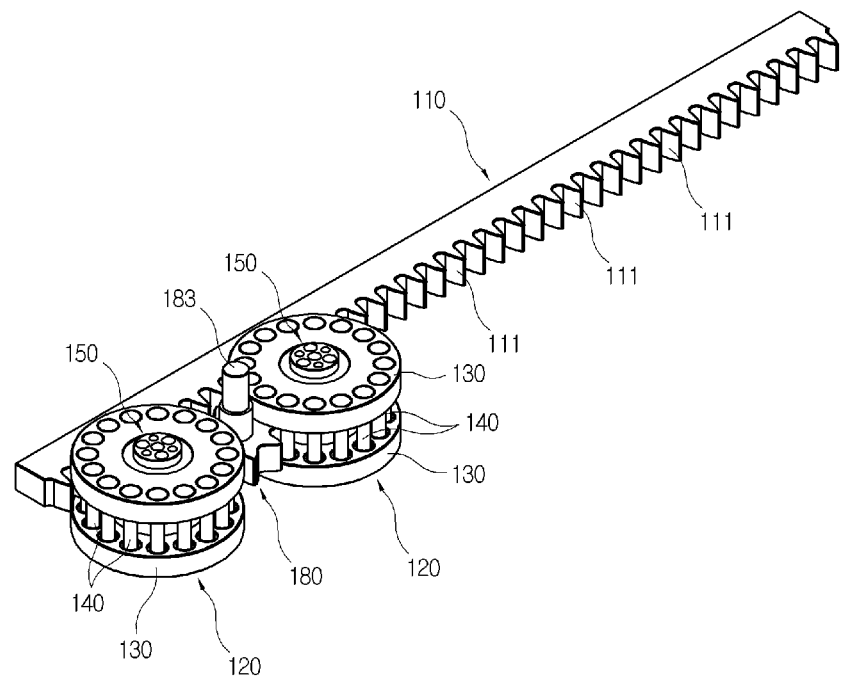

FIG. 1 is a perspective view illustrating a use state of a transmission device for converting a torque according to an embodiment of the present invention.

Figure 2:
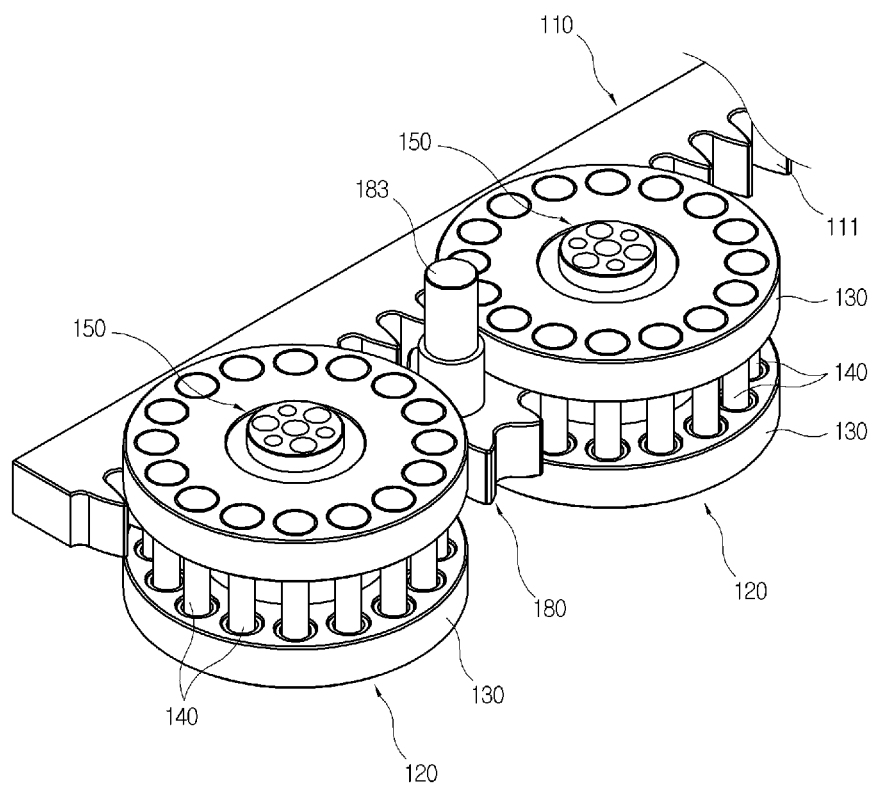

FIG. 2 is an enlarged perspective view of major portions in FIG. 1.

Figure 3:
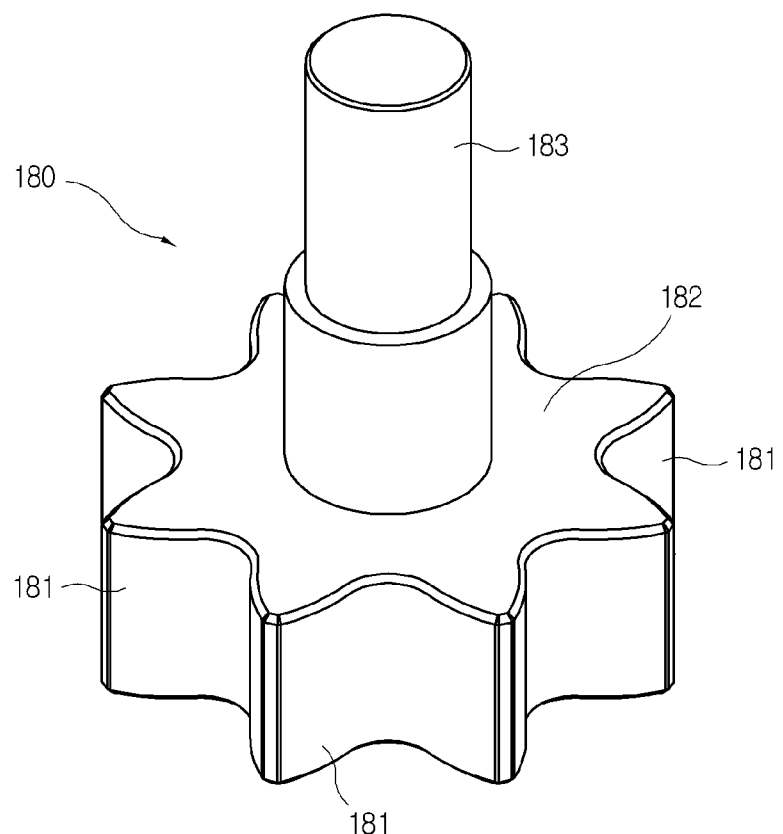

FIG. 3 is an enlarged perspective view of an input gear.

Figure 4:
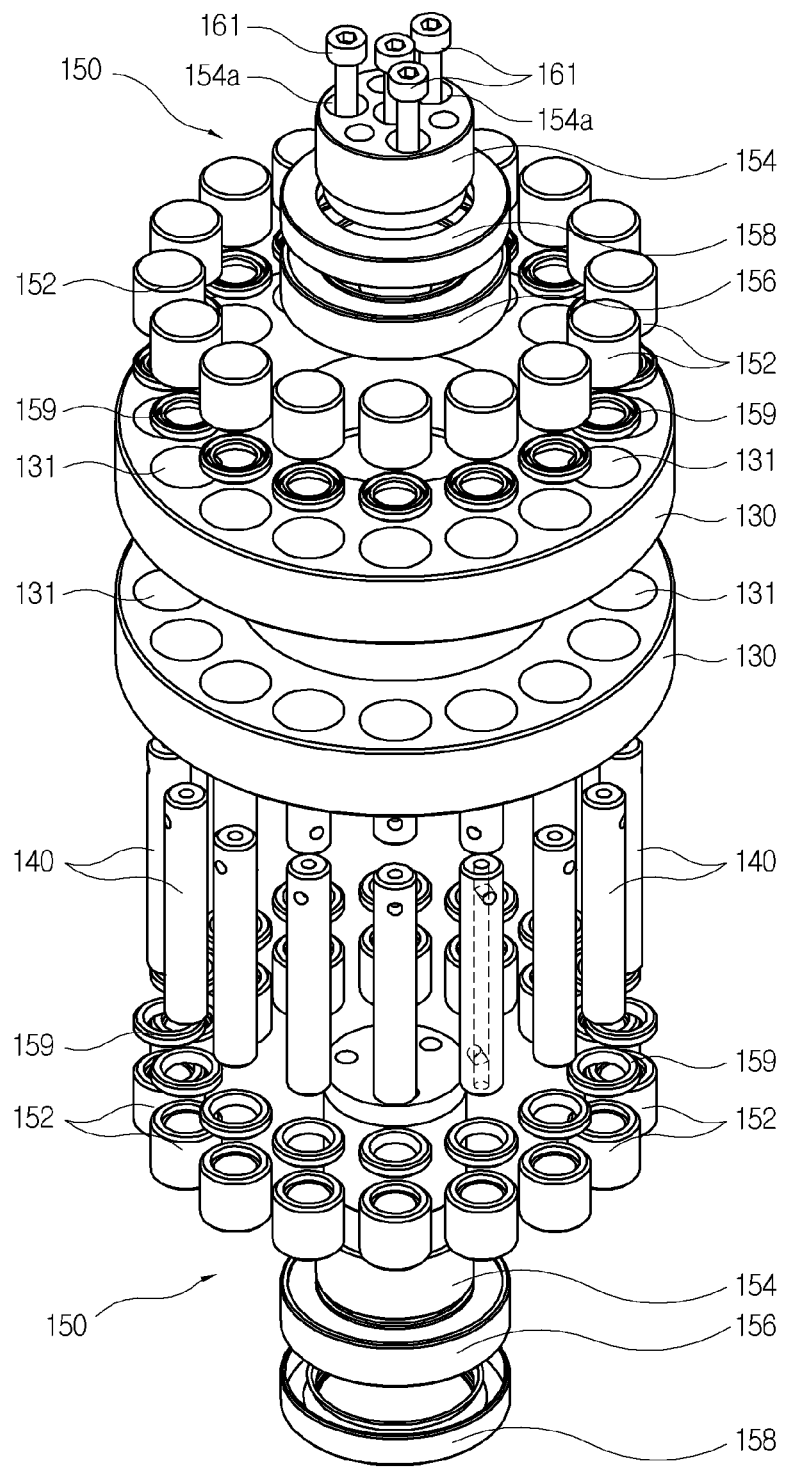

FIG. 4 is an exploded perspective view of a pinch gear.

Figure 5:
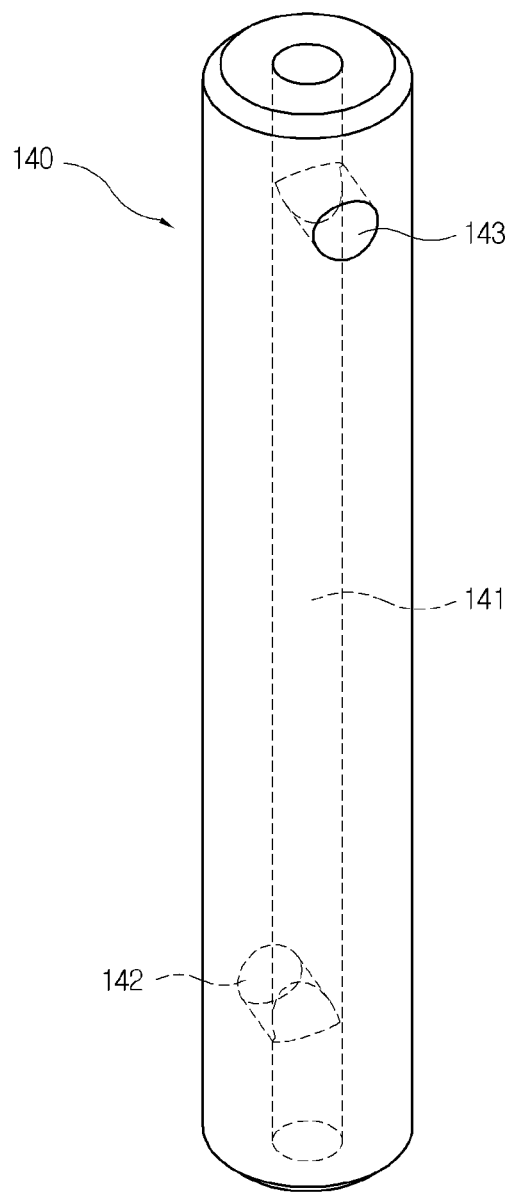

FIG. 5 illustrates an internal structure of the power transmission pin of FIG. 4.

BEST MODE

According to an aspect of the present invention, there is provided a transmission device for converting a torque which includes a rack having a plurality of rack tooth profiles, a plurality of pin gears provided separated from each other in a lengthwise direction of the rack, each pin gear having a plurality of power transmission pins relatively rotating along the plurality of rack tooth profiles for power transmission, and an input gear arranged between the pin gears and connecting the plurality of pin gears to be capable of rotating to allow the plurality of pin gears to rotate at the same speed.

Each of the plurality of pin gears includes a body for rotatably supporting the plurality of power transmission pins, and a rotation support bearing unit coupled to a center area of the body and supporting a rotational motion of the body.

The body may be provided by a pair of bodies that are arranged separated from each other and parallel to each other to be are connected to opposite end portions of each of the plurality of power transmission pins.

The rotation support bearing unit may be arranged at each of the pair of bodies to be symmetrically so that a radial load generated in the power transmission with the input gear is offset and an external force added to the rotation support bearing unit is reduced.

The rotation support bearing unit may include a plurality of pin support bearings arranged at an equiangular interval along a circumferential direction of the body as many as the number of the plurality of power transmission pins and supporting rotational motions of the plurality of power transmission pins, and a center portion rotation shaft provided at a rotation center portion of the body and forming a center of rotation with respect to the body and a center of revolution with respect to the plurality of power transmission pins.

The center portion rotation shaft may be coupled to the body by a plurality of coupling members.

The rotation support bearing unit may further include a center portion rotation shaft support bearing that is coaxially arranged with the center portion rotation shaft between the center portion rotation shaft and the body and supporting the center of rotation according to a rotational motion of the body.

The rotation support bearing unit may further include a center portion oil seal that is connected to the center portion rotation shaft support bearing and lubricating and hermetically sealing the center portion rotation shaft support bearing.

The rotation support bearing unit may further include a plurality of outer oil seals that are provided corresponding to the plurality of pin support bearings one by one and seals a plurality of pin insertion support holes in which the plurality of power transmission pins are inserted and supported are formed in the body.

A lubricant flow hole through which a lubricant flows may be provided in each of the plurality of power transmission pins along a lengthwise direction of each of the plurality of power transmission pins.

A lubricant inlet and a lubricant outlet, through which the lubricant is input and output, may be provided in a lateral wall of each of the power transmission pins to be connected to the lubricant flow hole.

The lubricant input and the lubricant output may be arranged in opposite directions along a radial direction of the plurality of power transmission pins at opposite end portions of the lubricant flow hole.

The input gear may include an input gear main body where a plurality of input tooth profiles are formed on an outer surface along a circumferential direction thereof to correspond to the plurality of power transmission pins of the plurality of pin gears and interact with the plurality of power transmission pins, and an input gear shaft protruding from a center area of the input gear main body.

The plurality of input tooth profiles may be any one of tooth profiles selected from a trochoid tooth profile, a cycloid tooth profile, and an involute tooth profile.

The input gear may be a single input gear and the plurality of pin gears may be provided by a pair with respect to the single input gear arranged between the plurality of pin gears.

MODE OF THE INVENTION

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIG. 1 is a perspective view illustrating a use state of a transmission device for converting a torque according to an embodiment of the present invention. FIG. 2 is an enlarged perspective view of major portions in FIG. 1. FIG. 3 is an enlarged perspective view of an input gear. FIG. 4 is an exploded perspective view of a pinch gear. FIG. 5 illustrates an internal structure of the power transmission pin of FIG. 4.

First, referring to FIGS. 1 and 2, the transmission device for converting a torque according to the present embodiment includes a rack 110 having a plurality of rack tooth profiles 111, a plurality of pin gears 120 provided separated from each other in a lengthwise direction of the rack 110, each of the pin gears 120 having a plurality of power transmission pins 140 relatively rotating along the rack tooth profiles 111 for power transmission, and an input gear 180 arranged between the pin gears 120 and connecting the pin gears 120 to be capable of rotating so that the pin gears 120 rotate at the same speed.

The rack 110 is a linear rod gear and performs a linear motion in interaction with the pin gears 120. In the present embodiment, although it will be described later, since the pin gears 120 are connected to the single rack 110 via the input gear 180, an increased nominal load capacity may be provided compared to a conventional technology while using the rack 110 having a limited size. In other words, not only the number of parts decreases but also foot print of a device decreases as well and thus the capacity may be increased at least twice compared to the conventional technology.

The rack tooth profiles 111 are continuously formed in the lengthwise direction of the rack 110 at one side of the rack 110. The rack tooth profiles 111 may adopt any one of a trochoid tooth profile, a cycloid tooth profile, and an involute tooth profile.

While the rack 110 performs a linear motion, the pin gears 120 perform a rotational motion. In the present embodiment, two pin gears 120 having the same structure are provided. Since this structure is a mere example, three or more pin gears 120 may be combined to be used.

Since the rack 110 performs a linear motion and the pin gears 120 perform a rotational motion, the transmission device for converting a torque according to the present embodiment may provide appropriate power to a processing apparatus (not shown) while the pin gears 120 move with respect to the rack 110 or the rack 110 moves with respect to the pin gears 120.

Each of the pin gears 120, as illustrated in FIG. 4, includes a pair of bodies 130, the power transmitting pins 140 rotatably supported by the bodies 130 and relatively rotating along the rack tooth profiles 111 of the rack 110 for power transmission, and a rotation support bearing unit 150 coupled to a center area of each of the bodies 130 and supporting a rotational motion of the bodies 130.

The bodies 130 are arranged in a pair separated from each other by the length of each of the power transmission pins 140 or less than the length thereof. The bodies 130 are connected to the opposite end portions of each of the power transmission pins 140 and rotatably support the power transmission pins 140.

A plurality of pin insertion support holes 131 in which the power transmission pins 140 are inserted and supported are provided in the bodies 130 at an equiangular interval along a circumferential direction. The power transmission pins 140 are rotatably supported between the bodies 130 and interact with the rack tooth profiles 111 of the rack 110. In other words, as the power transmission pins 140 each are engaged with the rack tooth profiles 111 to interact with each other, desired power is transmitted.

When the power transmission pins 140 are coupled to the bodies 130, if the power transmission pins 140 are fixed to the bodies 130 by a press-in method, the power transmission pins 140 of the bodies 130 revolve around the bodies 130. However, in the present embodiment, the power transmission pins 140 are coupled to the bodies 130 to be simultaneously capable of relatively rotating with respect to the bodies 130 at their positions. In other words, as described below, the power transmission pins 140 may perform rotational motions at their positions by means of a plurality of pin support bearings 152.

As a result, during the rotation of the bodies 130, the power transmission pins 140 simultaneously rotate and revolve along the bodies 130. The rotation of the power transmission pins 140 are made only when the power transmission pins 140 interact with the rack tooth profiles 111 of the rack 110 in contact with the rack tooth profiles 111.

To enable the power transmission pins 140 coupled to the bodies 130 to rotate and revolve at the same time, a lubrication structure for maintaining the rotation of the power transmission pins 140 smooth on the bodies 130 is provided. As illustrated in FIG. 5, a lubricant flow hole 141 through which a lubricant flows is provided in each of the power transmission pins 140 along the lengthwise direction of each of the power transmission pins 140. A lubricant outlet 142 and a lubricant inlet 143, through which the lubricant is input and output through the lubricant flow hole 141, are provided in a lateral wall of each of the power transmission pins 140 to be connected to the lubricant flow hole 141.

The lubricant outlet 142 and the lubricant inlet 143 may be arranged in the opposite directions along a radial direction of each of the power transmission pins 140 at the opposite end portions of the lubricant flow hole 141, as illustrated in FIG. 5. However, the present invention is not limited thereto and the lubricant outlet 142 and the lubricant inlet 143 may be arranged in the same direction.

The rotation support bearing unit 150 is coupled to a center area of each of the bodies 130 to support the rotational motions of the bodies 130. In the present embodiment, the rotation support bearing unit 150 is symmetrically coupled to the bodies 130. Accordingly, a radial load generated during the transmission of power with the input gear 180 may be offset and thus an external force added to the rotation support bearing unit 150 may be reduced. As a result, durability of the rotation support bearing unit 150 is improved so that a long term use thereof may be achieved.

In addition, as the rotation support bearing unit 150 is symmetrically coupled to the bodies 130, the rotation support bearing unit 150 may endure a load twice or more compared to a conventional technology based on the same bearing.

The rotation support bearing unit 150 includes a plurality of pin support bearings 152, a center portion rotation shaft 154, and a center portion rotation shaft support bearing 156. The pin support bearings 152 are arranged at an equiangular interval along a circumferential direction of the bodies 130 as many as the number of the power transmission pins 140, to respectively support the rotational motions of the power transmission pins 140.

A variety of roll bearings exhibiting superior strength including ball bearings may be used as the pin support bearings 152. An outer oil seal 159 is arranged between each of the pin support bearings 152 and each of the power transmission pins 140 to hermetically seal each of the pin insertion support holes 131 in which the power transmission pins 140 are inserted and supported.

The center portion rotation shaft 154 is provided at the rotational center portion of each of the bodies 130a and forms a rotational center with respect to each of the bodies 130 and a revolving center with respect to the power transmission pins 140. In other words, the center portion rotation shaft 154 forms a rotational center of each of the pin gears 120.

The center portion rotation shaft 154 is coupled to the rotational center portion of each of the bodies 130 by a plurality of coupling members 161. A plurality of coupling holes 154a to which the coupling members 161 may be coupled are formed in the center portion rotation shaft 154.

The center portion rotation shaft support bearing 156 is coaxially arranged with the center portion rotation shaft 154 between the center portion rotation shaft 154 and each of the bodies 130, to support the rotation center according to the rotational motions of the bodies 130.

A variety of roll bearings exhibiting superior strength including ball bearings may be used as the center portion rotation shaft support bearing 156. A center portion oil seal 158 is provided around the center portion rotation shaft support bearing 156. The center portion oil seal 158 is connected to the center portion rotation shaft support bearing 156 to lubricate and seal the center portion rotation shaft support bearing 156.

The input gear 180 is arranged between the pin gears 120 to rotatably connect the pin gears 120 so that the pin gears 120, that is, two pin gears in the present embodiment, may be rotated at the same speed.

As described above, when the size of the rack 110 is limited while nominal load capacity is large, a plurality of pin gears may be applied to a single rack. However, it is difficult to synchronize the rotations of pin gears in the conventional technology because pinions are simply applied. In the present embodiment, however, the above issue may be solved by applying the pin gears 120 having the above-described structural characteristics and connecting the pin gears 120 by the input gear 180.

The input gear 180, as illustrated in FIGS. 1 to 3, includes an input gear main body 181 where a plurality of input tooth profiles 182 are formed on an outer surface along a circumferential direction thereof to correspond to the power transmission pins 140 of the pin gears 120 and interact with the power transmission pins 140, and an input gear shaft 183 protruding from a center area of the input gear main body 181.

The input gear main body 181 is provided to be smaller than the size of each of the pin gear 120. Accordingly, the number of the input tooth profiles 182 formed on the outer surface of the input gear main body 181 is smaller than that of the power transmission pins 140. As a result, the input gear main body 181 with the pin gears 120 is advantageous in obtaining a deceleration rate. The number of the input tooth profiles 182 may be appropriately designed according to an environment of a process where the power transmission device according to the present embodiment is used. The input tooth profiles 182 may be any one of tooth profiles selected from a trochoid tooth profile, a cycloid tooth profile, and an involute tooth profile.

The input gear shaft 183 may be a portion to which a driving apparatus that is not illustrated. When the driving apparatus is connected to the input gear shaft 183, the initial power is provided through the input gear shaft 183 toward the input gear 180 and then transmitted to the rack 110 via the pin gears 120.

In the present embodiment, since the number of the input tooth profiles 182 is 8 and the number of the power transmission pins 140 is 16, a deceleration rate of 2, accurately, may be obtained.

In the above structure, when the driving apparatus is connected to the input gear shaft 183, as the driving apparatus is operated, the input gear 180 is rotated and thus the pin gears 120 connected to the input gear 180 are rotated.

When the pin gears 120 are rotated, the power transmission pins 140 provided in each of the pin gears 120 are engaged with the rack tooth profiles 111 of the rack 110 one by one to interact with each other. In other words, the pin gears 120 perform rotational motions and the rack 110 performs a linear motion.

Accordingly, as the pin gears 120 move with respect to the rack 110 and the rack 110 moves with respect to the pin gears 120, appropriate power may be provided to the processing apparatus.

For example, when the pin gears 120 perform rotational motions at their positions, the rack 110 performs a linear motion and thus power according to the linear motion of the rack 110 may be provided to the processing apparatus. Reversely, when the rack 110 is in a fixed state, the pin gears 120 are moved along the rack 110 while rotating and thus the linear motion or the rotational motion may be provided to the processing apparatus.

According to the power transmission device according to the present invention having the above structure and operation, since one or a plurality of pin gears are driven with a single driving apparatus, not only an increased nominal load capacity is provided compared to the conventional technology but also a desired level of a deceleration rate is obtained without a complex deceleration device while using the rack of a limited size. Thus, all rolling motions including a rotational motion by the input gear and a linear motion by the rack are available so that efficiency in power transmission may be improved.

While this invention has been particularly shown and described with reference to exemplary embodiments thereof, it will be understood by those skilled in the art that various changes in form and details may be made therein without departing from the spirit and scope of the invention as defined by the appended claims.

INDUSTRIAL APPLICABILITY

The power transmission device according to the present invention may be used for a variety of machine tools needing a rotational motion or a linear motion and further for industrial mechanical apparatuses, semiconductor or flat panel display manufacturing equipment, and various goods transport equipment.

The invention claimed is:

1. A transmission device for converting a torque comprising:
   a rack having a plurality of rack tooth profiles;
   a plurality of pin gears provided separated from each other in a lengthwise direction of the rack, each pin gear having a plurality of power transmission pins relatively rotating along the plurality of rack tooth profiles for power transmission; and
   an input gear arranged between the pin gears and connecting the plurality of pin gears to be capable of rotating to allow the plurality of pin gears to rotate at the same speed,
   wherein each of the plurality of pin gears comprises:
   a body for rotatably supporting the plurality of power transmission pins;
   and a rotation support bearing unit coupled to a center area of the body and supporting a rotational motion of the body,
   wherein the rotation support bearing unit comprises a center portion rotation shaft provided at a rotation center portion of each of the paired bodies and forming a center of rotation with respect to the body and a center of revolution with respect to the plurality of power transmission pins,
   wherein a plurality of pin support bearings arranged at an equiangular interval along a circumferential direction of the body as many as the number of the plurality of power transmission pins and supporting rotational motions of the plurality of power transmission pins,
   wherein the center portion rotation shaft of one of the paired bodies is coupled to the center portion rotation shaft of another of the paired bodies by a plurality of coupling members,
   wherein the input gear comprises an input gear main body where a plurality of input tooth profiles are formed on an outer surface along a circumferential direction thereof to correspond to the plurality of power transmission pins of the plurality of pin gears and interact with the plurality of power transmission pins.

2. The transmission device of claim 1, wherein the body is provided by a pair of bodies that are arranged separated from each other and parallel to each other to be are connected to opposite end portions of each of the plurality of power transmission pins.

3. The transmission device of claim 2, wherein the rotation support bearing unit is arranged at each of the pair of bodies to be symmetrically so that a radial load generated in the power transmission with the input gear is offset and an external force added to the rotation support bearing unit is reduced.

4. The transmission device of claim 1, wherein the rotation support bearing unit further comprises a center portion rotation shaft support bearing that is coaxially arranged with the center portion rotation shaft between the center portion rotation shaft and the body and supporting the center of rotation according to a rotational motion of the body.

5. The transmission device of claim 4, wherein the rotation support bearing unit further comprises a center portion oil seal that is connected to the center portion rotation shaft support bearing and lubricating and hermetically sealing the center portion rotation shaft support bearing.

6. The transmission device of claim 1, wherein the transmission device further comprises a plurality of outer oil seals that are provided corresponding to the plurality of pin support bearings one by one and seals a plurality of pin insertion support holes in which the plurality of power transmission pins are inserted and supported are formed in the body.

7. The transmission device of claim 1, wherein a lubricant flow hole through which a lubricant flows is provided in each of the plurality of power transmission pins along a lengthwise direction of each of the plurality of power transmission pins.

8. The transmission device of claim 7, wherein a lubricant inlet and a lubricant outlet, through which the lubricant is input and output, are provided in a lateral wall of each of the power transmission pins to be connected to the lubricant flow hole.

9. The transmission device of claim 8, wherein the lubricant input and the lubricant output are arranged in opposite directions along a radial direction of the plurality of power transmission pins at opposite end portions of the lubricant flow hole.

10. The transmission device of claim 1, wherein the input gear further comprises:
    an input gear shaft protruding from a center area of the input gear main body.

11. The transmission device of claim 10, wherein the plurality of input tooth profiles are any one of tooth profiles selected from a trochoid tooth profile, a cycloid tooth profile, and an involute tooth profile.

12. The transmission device of claim 1, wherein the input gear is a single input gear and the plurality of pin gears are provided by a pair with respect to the single input gear arranged between the plurality of pin gears.

* * * * *